April 12, 1927.  1,624,037
E. A. BUTLER
APPARATUS FOR DEFLOCCULATING AND EMULSIFYING
Filed April 30, 1925
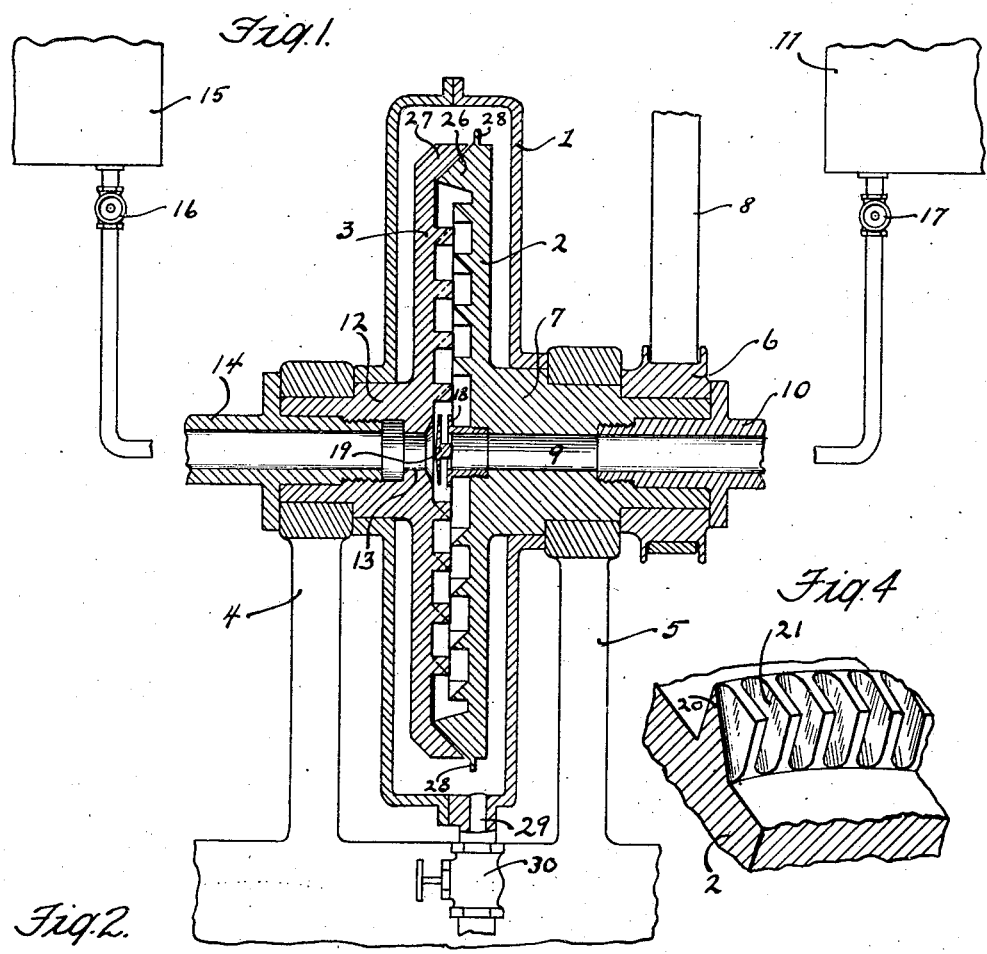
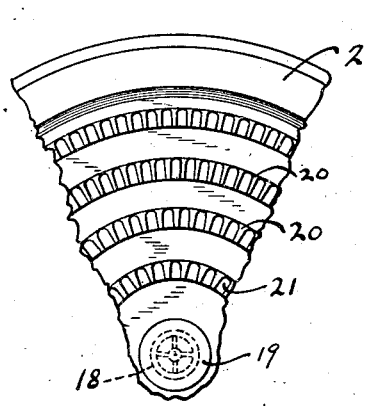
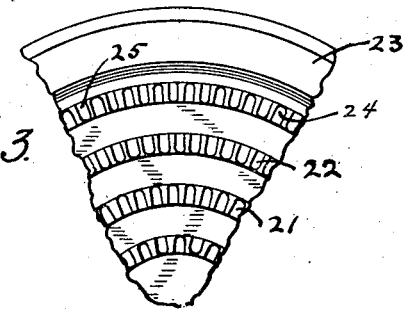
INVENTOR
Edward A. Butler
BY
John W. Thompson
ATTORNEY Patented Apr. 12, 1927.

1,624,037

UNITED STATES PATENT OFFICE.

EDWARD A. BUTLER, OF BUFFALO, NEW YORK, ASSIGNOR TO COLLOIDAL EQUIPMENT CORPORATION, OF NEW YORK, N. Y., A CORPORATION OF NEW JERSEY.

APPARATUS FOR DEFLOCCULATING AND EMULSIFYING.

Application filed April 30, 1925. Serial No. 26,909.

The present invention relates to an improvement in apparatus for and method of deflocculation and emulsification. An object of said invention has been to more readily and economically sub-divide or disintegrate solids to a state of sub-division in which they will exhibit some of the properties of a colloid. A further object has been to effect a mixture of liquids or a liquid and a solid to form an emulsion or emulsions more rapidly and economically than is possible in many cases through purely chemical reactions.

An embodiment of one form of apparatus illustrating my invention and by means of which my improved method may be in part carried out, is illustrated in the drawings accompanying the present specification, and in which—

Figure 1 is a central vertical section with portions shown diagrammatically,

Figure 2, a fragmentary view of an interior surface,

Figure 3, a fragmentary view of an interior surface of a modified form, and

Figure 4, a detail in perspective illustrating a portion of the device shown in Figure 2.

Referring to the drawings, a housing 1 encloses cooperating rotors 2 and 3 which are journaled in brackets 4 and 5 respectively. It is contemplated that a stator may in some instances be substituted for one of the rotors. However, when both elements are intended to be rotated, suitable means will be provided for rotating them in opposite directions. As shown in Figure 1, a pulley 6 is mounted on the hub 7 of the rotor 2, said pulley being driven by means of a belt 8 which is in turn actuated by a source of power not shown. If desired, a similar or other suitable driving means may be applied to actuate the rotor 3. The hub 7 is provided with a central conduit 9 which communicates through a hollow shaft 10 with a tank or other container 11 adapted to hold a supply of material to be treated. Similarly, the hub 12 of the rotor 3 has a conduit 13 communicating with a hollow shaft 14 which is in turn operatively connected with a tank 15, the flow of material therefrom being controlled by a valve 16, while a similar valve 17 controls the flow of material from the tank 11. A spider 18 is secured opposite the inner end of the conduit 9 and supports a baffle 19 which is convex on the side facing the conduit 13, said conduit being enlarged at its inner end to form a flared discharge opening opposite said baffle 19.

Each of the rotors is provided with a plurality of concentric circular projections 20 alternating with concentric circular grooves. In a preferred form of apparatus, the projections on one rotor are positioned opposite the grooves in the other rotor. Any suitable part or all of the projections are provided with recesses 21 extending through two faces of the projection and preferably having their central longitudinal axes extending radially. In Figure 4, the recesses 21 are shown each with its bottom surface disposed at an angle to the normal surface of the rotor 2. In Figure 3, recesses 22 are arranged with their openings directed away from the center, whereas, openings 21 are directed toward the center of the rotor 23. Figure 3 also shows recesses 24 and 25 arranged in alternating relation, that is, the openings of the recesses 24 being directed toward the center and the openings of the recesses 25 being directed away from the center of the rotor.

One of the rotors, as 2, is provided with a peripherally disposed annular baffle or stop 26 extending toward the rotor 3 and cooperating with a peripheral annular projection 27 on said rotor 3 to form a constricted annular passageway between said rotors. Means not shown may be provided in connection with one or both of the rotors whereby one may be moved toward or away from the other to regulate the space between the peripheral portions 26 and 27. A peripheral flange 28 extends beyond the outer surface of the rotor 2 and is positioned opposite the opening of the passageway between the members 26 and 27. The housing 1 has a discharge opening 29 controlled by a valve 30.

In operation of the apparatus hereinabove described, the material or materials to be treated may be fed through the hollow shafts 10 and 14 from one or both of the tanks 11 and 15 respectively, or from any other suitable source of supply. Where one of the projection carrying members is a stator, the other member will be rotated at very high speed while the material to be treated is fed in through the central opening. Coming in contact with interior surfaces of the rotating member, the material will be moved rapidly toward the periphery thereof, encountering abrupt changes of direction in its course, such changes being produced by the circular or annular projecting members and the recesses formed therein. Where both members in the housing are rotors, they will be rotated in opposite directions at very high speed and the material to be treated will be introduced through either or both of the central openings as hereinabove described. The baffle 19 will serve to guide the material initially as it comes from either of the openings. In operation, axial adjustment between the rotors will be made to meet the requirements of different materials to be treated. Also, some materials are treated at higher speed than others.

The apparatus hereinabove described may be utilized to accomplish in part a step or steps in my improved method or deflocculation, disintegration or sub-division which includes the step of imparting rapid motion of translation to confined increments of a solid and repeatedly changing the direction of said motion very abruptly and until the increments of the solid are reduced to molecular dimensions or of such other size as to exhibit properties of a colloid. It will be desirable in a great number of cases that the operation described above take place with the solid in a liquid medium preferably of such a nature that the particles of molecular or other size will remain suspended in said medium or in intimate admixture therewith. It is of course possible that other apparatus than that hereinabove described may be utilized for imparting the rapid motion of translation to the confined increments of solid matter and, so far as my new method is concerned, I do not confine myself to the use of said apparatus in connection therewith. My improved method of emulsification includes the step of reducing the component materials to molecular or other very small dimensions and intimately mixing the same preferably in the presence of a suitable stabilizer protective colloid or other ingredient for retaining the materials in emulsion form. These operations will be conducted either with or without application of heat, depending on the character of the material treated and the result desired.

The operation of the apparatus hereinabove described takes place under conditions which render observation rather difficult. It is therefore not feasible to attempt an explanation of the reason for the results obtained therein. One theory is that the particles of the materials treated are impacted against each other and against the walls of the confining rotors with such tremendous force that they are successively disrupted until they reach the very fine state of sub-division in which they exhibit some of the properties of material of molecular size. Another theory is that the polarity of the various components of materials is changed by the forces acting upon the particles thereof in the operation of the apparatus and that this change of polarity results in a regrouping of the materials in such a way that they resemble colloids in some respects. It is quite possible that further investigation will confirm one or the other of these theories or will perhaps result in demonstrating that an entirely new theory will present the most satisfactory explanation of the results obtained. I do not, however, limit myself to any theory of operation.

In using apparatus embodying features of my invention hereinabove described, I have accomplished disintegration of solids to a condition of fineness in which they remain suspended in a liquid medium without addition of a colloid even in the cases of solids of substantial specific gravity. I have also produced emulsions by mechanical means which have heretofore not been produced to my knowledge by chemical means, and I have produced well known emulsions in materially shorter time and more economically than has been possible in connection with processes heretofore known and in many instances these emulsions have exhibited more stability than said well known emulsions. Furthermore, in some forms of disintegrating machines, operation has been unsuccessful because of agglomeration or flocculation of the materials therein. My improved apparatus prevents or disperses such agglomeration and therefore permits a steady discharge flow of the disintegrated material.

I claim as my invention:

1. Apparatus for deflocculation, emulsification, or disintegration comprising a chamber, a rotor closing one side thereof, recessed annular projections extending into said chamber from its opposite sides, the recesses at one side of said chamber being inclined oppositely to those at the other side thereof.

2. A disintegrator comprising opposed rotors each provided with a plurality of concentric annular projections alternating with concentric annular grooves, the projections of one rotor being positioned opposite grooves of the other rotor, and said projections being provided with recesses each having its bottom surface inclined with respect to the rotor axis and the bottom surfaces of recesses of one rotor being disposed at an angle to the bottom surfaces of recesses of the opposite rotor.

3. In a disintegrator the combination of opposed rotors having inlet openings extending therethrough and a baffle arranged between the inner ends of said inlet openings.

4. A disintegrator comprising opposed rotors each provided with a plurality of concentric annular projections alternating with concentric annular grooves, the projections of one rotor being positioned opposite grooves of the other rotor and entirely at one side of a median plane extending between said rotors, and said projections being provided with recesses each having its bottom surface inclined with respect to the rotor axis, and the bottom surfaces of recesses of one rotor being disposed at an angle to the bottom surfaces of recesses of the other rotor.

In testimony whereof, I have signed my name to this specification this 18 day of April, 1925.

EDWARD A. BUTLER.